United States Patent [19]

Sprenger et al.

[11] Patent Number: 5,134,779
[45] Date of Patent: Aug. 4, 1992

[54] PLOTTER WITH FLAT-BED TABLE AND INSTRUMENT CARRIAGE

[75] Inventors: Franz Sprenger; Ottmar Koeppel, both of Widnau/St. Gallen, Switzerland

[73] Assignee: Wild Leitz AG, Heerbrugg, Switzerland

[21] Appl. No.: 458,679

[22] PCT Filed: May 26, 1989

[86] PCT No.: PCT/EP89/00597

§ 371 Date: Jan. 25, 1990

§ 102(e) Date: Jan. 25, 1990

[87] PCT Pub. No.: WO89/11634

PCT Pub. Date: Nov. 30, 1989

[30] Foreign Application Priority Data

May 26, 1988 [CH] Switzerland .................. 02030/88-3

[51] Int. Cl.⁵ .................. G01D 15/16; F16H 55/52
[52] U.S. Cl. .................. 33/1 M
[58] Field of Search .................. 33/1 M, 23.03; 346/139 R, 139 A, 139 B; 74/89.22

[56] References Cited

U.S. PATENT DOCUMENTS 3,044,312  7/1962  Hall et al. .................. 74/89.22
3,068,575 12/1962  Fenske et al. .
3,611,819 10/1971  Muller et al. .................. 346/139 B X
4,524,520  6/1985  Levy .................. 346/139 B X
4,719,811  1/1988  Lang et al. .................. 74/89.22

FOREIGN PATENT DOCUMENTS 2462381  2/1981  France .

*Primary Examiner*—Harry N. Haroian
*Attorney, Agent, or Firm*—Foley & Lardner

[57] ABSTRACT

A plotter having a flat-bed, a beam-shaped tool carriage having opposite ends and movable in a first coordinate direction, work stands located at each end of the tool carriage, a tool holder movable on the tool carriage in a second coordinate direction orthogonal to the first coordinate direction, controlled drive motors for the two travel movements is provided with a drive connection from the drive motor for the first coordinate direction to the tool carriage, said drive connection being provided from muliple cable strands each comprising at least four individual cables guided in parallel. The individual cables loop around drive pulleys to secure the tool carriage tightly in each work stand. Rockers pivotally mounted on each word stand and containing reverse rollers through individual cables pass through, equalize the tensile stresses of the individual cables. This results in an improved repeat accuracy of the positioning of the plotter tool.

7 Claims, 4 Drawing Sheets

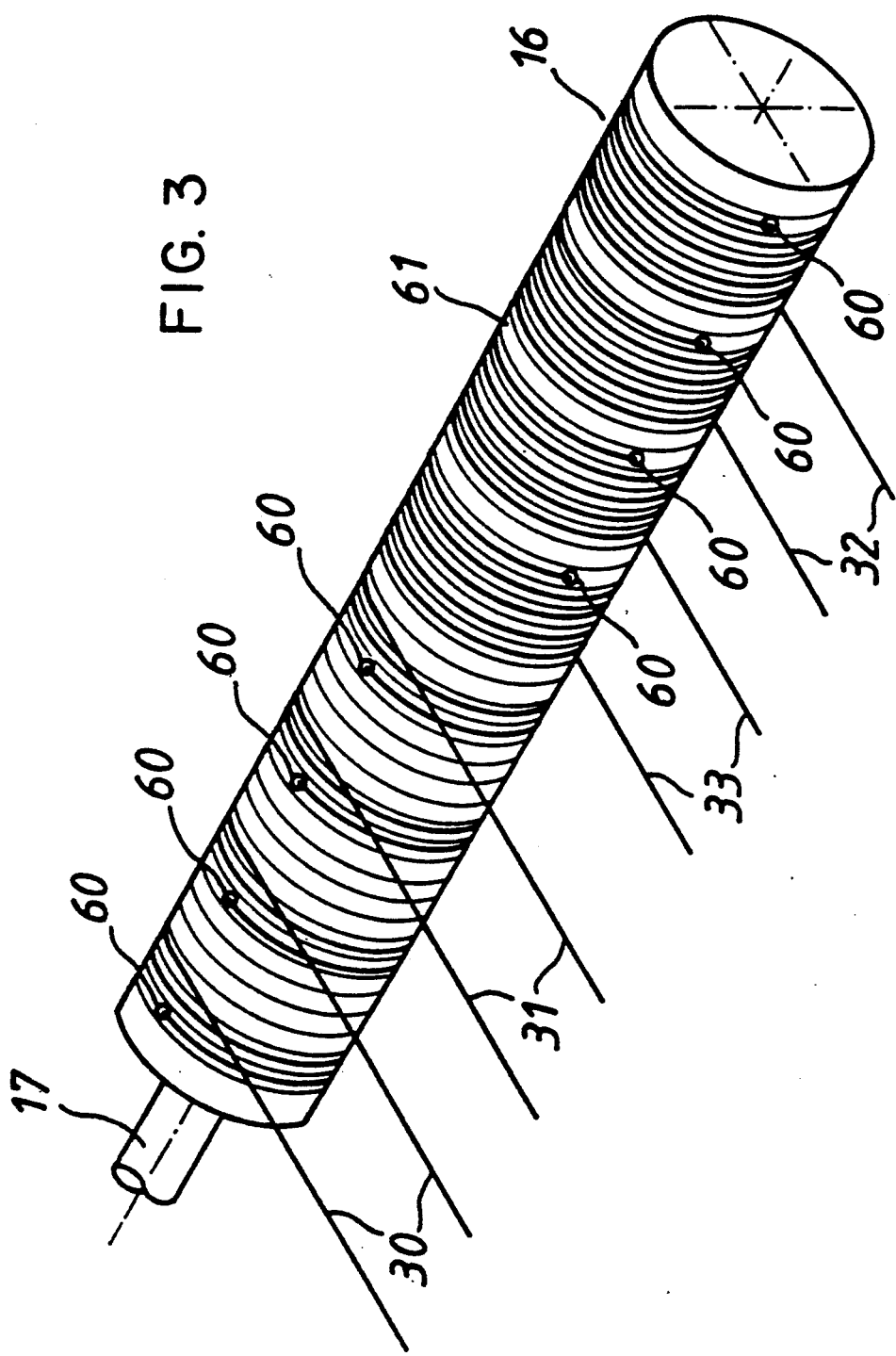

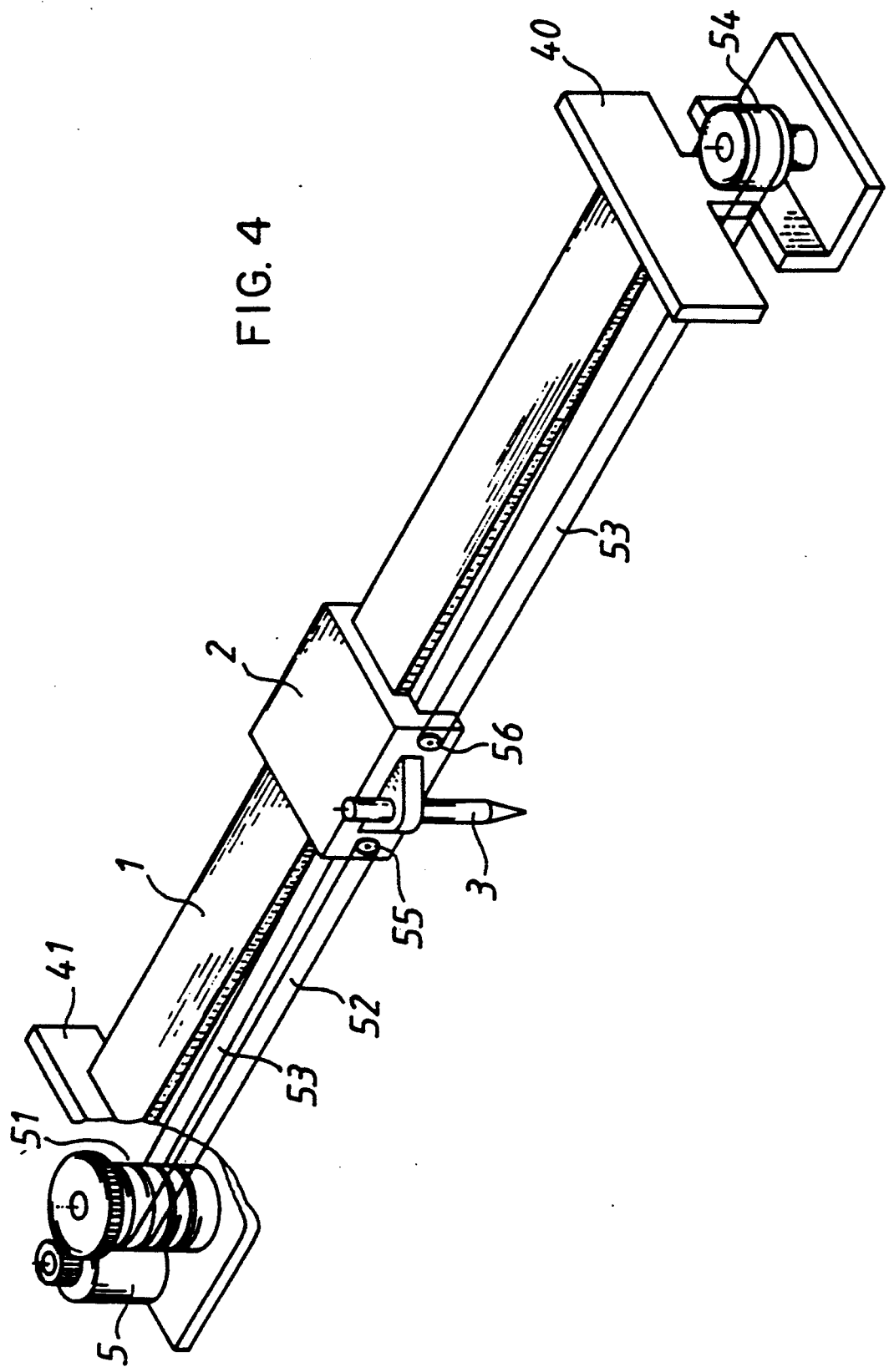

PLOTTER WITH FLAT-BED TABLE AND INSTRUMENT CARRIAGE

BACKGROUND OF THE INVENTION

The invention relates to a plotter having a flat bed and having a tool carriage which can be moved in a first co-ordinate direction and having a tool holder which can be moved on the carriage in a second co-ordinate direction which is orthogonal to the first co-ordinate direction.

Flat-bed plotters of this type are used for drawing, cutting, milling or similar operations, with the appropriate tools being set in the tool holder. The flat-web material to be processed, e.g. paper, sheets, cardboard or textile webs, are situated on the flat bed. The movements of the tool holder in the first and second directions are carried out and controlled by a program. Drive motors are provided to drive the tool carriage in the X direction and the tool holder in the Y direction, said drive motors being controlled via a control circuit in accordance with the predetermined program.

The conversion of the rotary movement of the drive motors into the linear movement of the tool holder is accomplished in different ways on existing plotters. A first type of plotter, for example, employs toothed racks for the movement of the tool carriage in the X direction, said racks extending at the edge of the flat-bed, outside the working surface. These racks are considered to be robust components. However, they are expensive to manufacture, thereby increasing the price of the apparatus considerably. Toothed belts are also customary. However, they cannot guarantee the desired rigidity and freedom from play of the drive.

The second customary type of drive connection between the co-ordinate drives and the tool holder comprises cable strands at both ends of the tool carriage. The cables, in general steel cables, like the racks, extend on both sides at the edge of the flat bed. They are each passed via a driving pulley and via one or more deflection pulleys and engage on the tool carriage in both directions along the X axis in an endless loop. Although single-core wires deliver the better values for this purpose as regards tensile strength, stranded wires are predominantly used since they have the better flexural elasticity. The cables can thus be passed via deflection rollers of smaller diameter, a more compact overall construction thereby being achieved.

However, the use of stranded wires leads to the problem of plotter resolution and accuracy. Plotters of this kind should have a high addressable resolution, e.g. of 0.005 mm, and have a high static repeating accuracy when being positioned, e.g. of about 0.01 mm. Such values make very high demands on the stiffness, i.e. the spring constant of the cables. For a given mass of the carriage system and for a given acceleration, the stiffness is responsible for the dynamic accuracy, i.e. the line quality of the plotter. As an example, the acceleration can quite easily reach 10 m/s$^2$, while the speed of travel is, for example, 1.0 m/s.

In known large-format plotters, only simple cable drives having steel cables having a nominal diameter of about 2 mm have been employed for driving the tool carriage. In this manner, only relatively modest values for the rigidity of the carriage system were achieved, with the result that this kind of drive could only be used for plotters of an inferior accuracy.

SUMMARY OF THE INVENTION

It is therefore an object of the present invention to provide measures whereby cable-pull connections can also be used for large-format precision plotters without restriction, to drive the tool carriage.

In achieving the stated object, the present invention provides for a plotter comprising a flat bed, a beam shaped tool carriage having opposite ends and movable in a first coordinate direction, a tool holder movable on the tool carriage in a second coordinate direction orthogonal to the first direction, each of said tool carriage and said tool holder having drive means for driving each device in said first or second coordinate direction, drive strands positioned at each end of the tool carriage, said drive strands each comprising a rocker.

BRIEF DESCRIPTION OF THE DRAWING

FIG. 3 illustrates the guidance of the individual cables 30, 31, 32, and 33 on drive roll 16 shown in FIG. 1.

FIG. 4 illustrates a detailed perspective view of the Y-drive for the tool holder 2, as shown in FIG. 1.

DETAILED DESCRIPTION OF THE PREFERRED EMBODIMENT

Pursuant to the present invention, a plotter uses relatively thin stranded cables, but with better values for rigidity and thus of the repeat accuracy and dynamic accuracy in the positioning of the tool carriage being achieved when compared with thicker cables on plotters of relatively low quality. By this type of multiple arrangement of relatively thin stranded cables, optimization of the two opposing variables of flexural elasticity and stiffness are achieved. The high repeating accuracy in the positioning of the tool carriage is guaranteed over a long period without residual oscillation even in the case of frequent jerky loading by severe acceleration or braking of the carriage.

Details of the invention are described in greater detail below with reference to a preferred embodiment.

Figure 1:
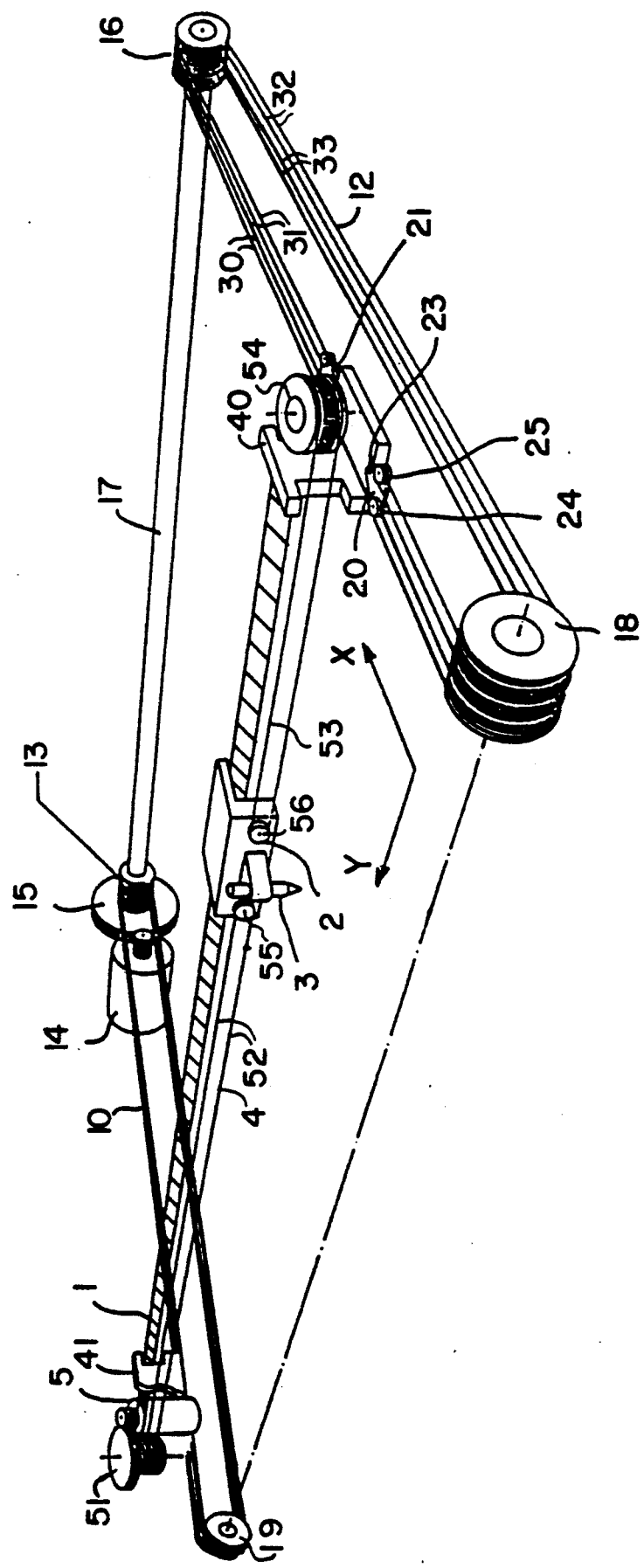
FIG. 1 shows a perspective view of a cable drive on a plotter in a preferred embodiment.

As illustrated in FIGS. 1 and 4, a tool carriage 1 can be displaced over a flat plotter bed in a first coordinate or X direction. Located on opposite ends of the tool carriage 1 are drive stands 40 and 41. The tool carriage 1 is also designed as a guide for a tool holder 2. Tool holder 2 can be moved in the second coordinate direction orthogonal to the X direction, (hereinafter referred to as the Y direction) on the beam-shaped tool carriage 1. Tools 3, which can be inserted into the tool holder 2, serve for working material in sheet form which rests on the flat-bed situated underneath it. The tools provided can, for example, be pens, cutting blades or milling head inserts.

As shown in FIG. 4, the tool holder 2 is driven along the beam-shaped tool carriage 1 in the Y direction by a Y drive motor 5, via a cable drive 4 including two individual cables 52,53 and a drive roll 51. The drive motor 5 is positively connected with the drive roll 51, with the individual cables 52,53 attached to and wound several times around the drive roll 51. With this arrangement, each individual cable forms a loop, wherein the first loop formed by cable 52 runs through drive roll 51 and is wound around a roller 55 rotatably mounted on tool holder 2. The second loop formed by cable 53 runs through drive roll 51, over a reversing roll 54 located on the drive stand 40, to a second reversing roll 56 mounted on the tool holder 2. Since this arrangement integrally connects tool holder 2 to the Y drive 4, the movement of tool holder 2 is clearly dependent upon the direction of rotation of the Y-drive motor 5 along the tool carriage 1, whereby for example the individual cable 52 is wound off with its two cable ends from the drive roll 51 and the individual cable 53 is wound on with its two cable ends from drive roll 51. To drive the tool holder 2 in the Y direction, for example, individual cable 52 is unwound from drive roll 51, while cable 53 is simultaneously wound on. The cable ends are fastened similarly in the manner shown in FIG. 3 for cables 30–33 in recesses 60.

Figure 2:
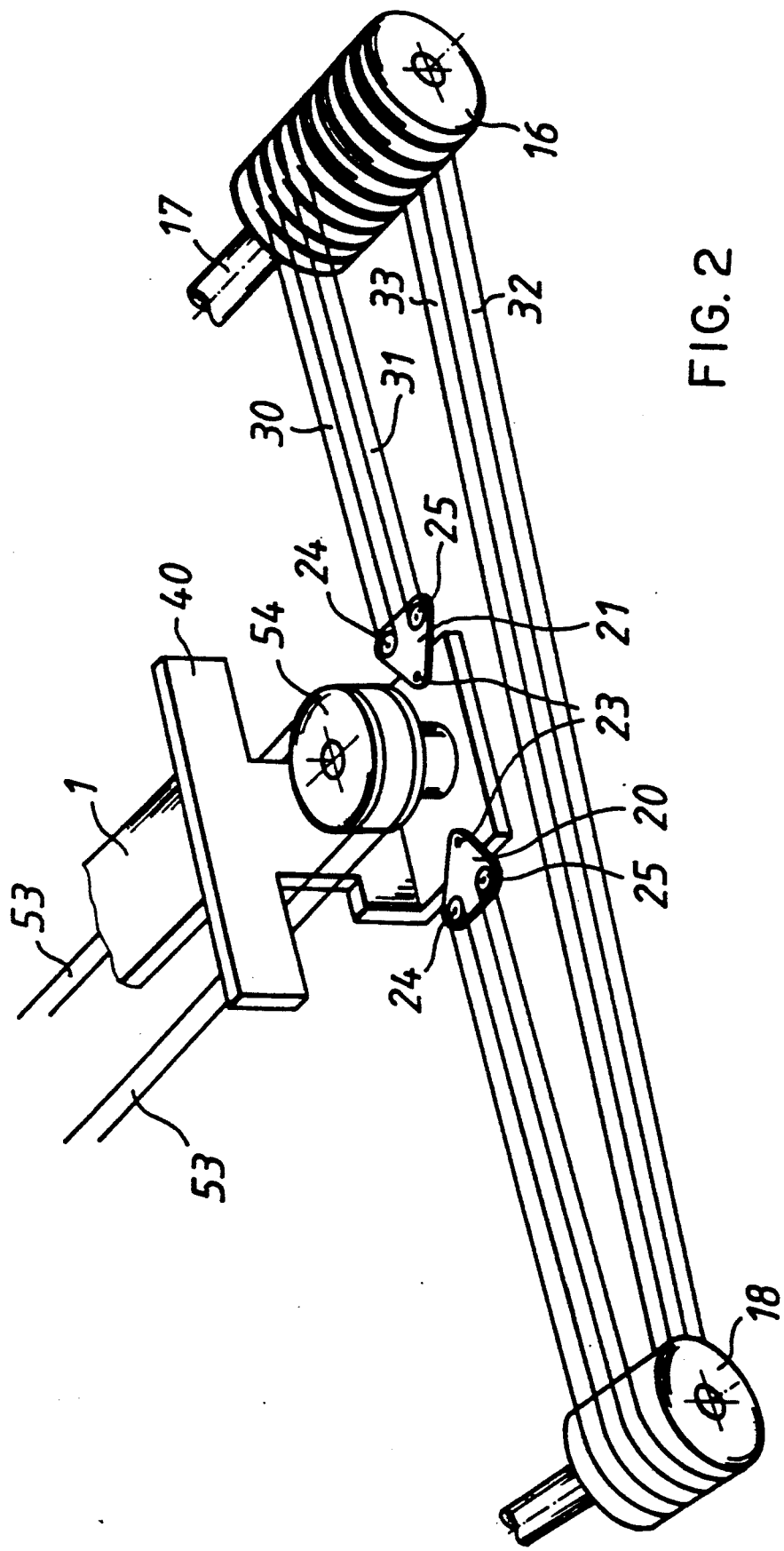
FIG. 2 shows a detailed perspective view of the drive roll 16, reversing roll 18 and drive roll 17 shown in FIG. 1.

As also illustrated in FIGS. 1 and 2, the tool carriage 1 is displaceable in the X direction over a flat bed with each end of the carriage being equipped with a drive strand 40,41. As shown in greater detail in FIG. 2, mounted on opposite ends of each drive strand are rockers 20 and 21. As shown for example on strand 40, the rockers 20,21 are mounted by means of a bearing 23 and are each additionally equipped with two reversing rolls 24 and 25. The reverse rolls preferably have a threaded profile.

The entire tool carriage 1 together with the tool holder 2 mounted thereon slides in the X direction, with the cable drive 4 and Y drive motor 5 sliding on guides on the plotter bed, not shown. The tool carriage 1 is driven on its drive strand 40,41 by parallel cable drives 10 and 12 jointly driven by an X drive motor 14. The cable drives 10 and 12 are of identical design and each comprise at least four individual cables 30,31,32, and 33. The drive strand 40 and 41, respectively is clamped over these individual cables. The two individual cables 30 and 31 run only from drive pulley 16 to rocker 21 and back, while the individual cables 32,33 are guided over the reversing roll 18 to the rocker 20 and back to drive pulley 16. They are described in greater detail below.

Via a suitable reduction gear unit, the motor 14 drives first driving pulleys 15 and 16, which are coupled together rigidly by a drive shaft 17. As seen in the figure, individual cables 32,33 are wound several times around drive pulley 16 and are attached with their first ends to this drive pulley. From drive pulley 16, individual cables 32,33 are returned over a floatingly supported reversing pulley 18 to reversing rolls 24, 25 on rocker 20 and are reversed by 180 degrees. From there, individual cables 32,33 are returned over reversing roll 18 to drive pulley 16. At drive pulley 16 they are again wound several times and attached to the roll by their second cable ends, so that no slipping takes place. This arrangement of the individual cables therefore can be defined as a loop arrangement. For accurate guidance of the cables, drive pulleys 15 and 16 are in the form of threaded rolls thereby having a threaded profile.

The individual cables 30,31 of the multiple cable 12 form a loop arrangement similar to that of the individual cables 32,33 and are attached by their first ends to drive pulley 16 and wound several times onto the pulley. Both cables 30 and 31 are guided parallel to each other onto the rocker 21 and are also reversed 180 degrees by reversing rolls 24,25 and then returned to drive pulley 16. The cables 30,31 are again wound several times around drive pulley 16 and attached by their second ends. Thus for example, if drive pulley 16 is rotated by means of the drive roll 17 then individual cables 30 and 31 are wound off drive pulley 16 and individual cables 32,33 simultaneously wound onto drive pulley 16. The tool carriage 1 is thereby moved in the X direction.

FIG. 3 illustrates the guidance of the individual cables 30, 31, 32, and 33 on drive roll 16. Drive rolls 13 and 51 illustrated in FIG. 1 are similar and also have the same threaded profile 61. This profile is intended to precisely guide individual cables 30–32 on the associated drive rolls during winding and unwinding of the cables. As also clearly illustrated the two ends of individual cables 30–32 are fastened to attachment points 60.

The rockers 20 and 21 equalize any potentially different tensile stresses in the individual cables 30–33 of the multiple cable 12, so that the cable stresses acting on the tool carriage 1 is always distributed uniformly. In this manner, the control amplifiers controlling the X drive motor 14 may be operated with a higher control amplification, without causing the control circuit decaying into self-oscillation. This results in a more precise, rapid and more effective setting of the plotter tool, while maintaining a high working accuracy.

In the preferred embodiment, the four cables of the multiple cable strand 12 have a nominal diameter of 1.5 mm. They comprise, for example, 7×7 cores. The diameter of the pulleys 15, 16, 18, 19 is, for example, 80 mm. Tests have shown that cables having a larger nominal diameter and more cores exhibit poorer values for rigidity. For example, under the conditions described, cables of 1.5 mm diameter had a 30 percent greater rigidity (measured as the spring constant in the axial direction), compared to cables of 2.0 mm diameter. In conjunction with the manner in which the cables are guided, the preferred choice of multi-core steel cables having a diameter of about 1.5 mm to drive the tool carriage on precision plotters in combination with the cable guidance arrangement therefore represents a particularly advantageous design solution which leads to surprising improvements of unexpected magnitude, relative to repeat accuracy in the positioning of the plotter tool.

We claim:
1. A plotter comprising:
a flat bed;
a beam shaped tool carriage having opposite ends and movable in a first coordinate direction;
a tool holder slidably disposed on said tool carriage and movable in a second coordinate direction orthogonal to said first direction;
drive stands located on each end of said tool carriage;
first and second rockers pivotably mounted on opposite ends of each drive strand, each having reversing rolls;
first drive means for driving said tool holder in said second coordinate direction;
second drive means for driving said tool carriage in said first coordinate direction, said second drive means comprising at least two drive pulleys coupled by a drive shaft;
multiple cables looped around each drive pulley, each multiple cable comprising at least four individual cables wound several times around the respective drive pulley; and
wherein said loops of a first pair of said individual cables are guided parallel to each other through the reversing roll of said first rocker, and the loops of a second pair of said individual cables are guided parallel to each other through a reversing roll of said second rocker, such that said rockers equalize any potentially different tensile stresses in said individual cables and cable stresses acting on said tool carriage are always distributed uniformly.

2. A plotter as claimed in claim 1, wherein said first drive means comprises a drive motor, a drive roll positively connected to said drive motor, and at least two individual cables attached to and wound several times around said drive roll.

3. A plotter as claimed in claim 1, wherein said individual cables each have a nominal diameter of less than 2 mm.

4. A plotter as claimed in claim 1, wherein said first and second rockers are articulated onto the drive stand and are each equipped with at least two reversing rolls, around which said individual cables are wound.

5. A plotter as claimed in claim 1, wherein said multiple cables are identical in their configuration.

6. A plotter as claimed in claim 1, wherein said drive pulleys are configured with a threaded profile.

7. A plotter as claimed in claim 1, wherein said reversing rolls are configured with a threaded profile.

* * * * *